235-381 SR
4/9/85 XR 4,510,382

United States Patent [19]
Walter

[11] Patent Number: 4,510,382
[45] Date of Patent: Apr. 9, 1985

[54] METHOD OF DETECTING FALSE DATA RECORDING MEDIA AND A DATA RECORDING MEDIUM THEREFOR

[75] Inventor: Hans-Jürgen Walter, Weil der Stadt, Fed. Rep. of Germany

[73] Assignee: Mico Datensysteme GmbH, Weil der Stadt, Fed. Rep. of Germany

[21] Appl. No.: 468,686

[22] Filed: Feb. 22, 1983

[30] Foreign Application Priority Data

Jun. 19, 1982 [DE] Fed. Rep. of Germany ....... 3223034

[51] Int. Cl.³ .............................................. G06K 5/00
[52] U.S. Cl. .................................. 235/380; 235/381; 235/382; 235/382.5
[58] Field of Search ............. 235/380, 381, 382, 382.5

[56] References Cited

U.S. PATENT DOCUMENTS 4,256,955 3/1981 Giraud ............................... 235/380

*Primary Examiner*—Harold I. Pitts
*Attorney, Agent, or Firm*—Fleit, Jacobson, Cohn & Price

[57] ABSTRACT

A method of detecting false data recording media and a data recording media therefor useful in the cash-free procurement of products or service from automatic service rendering or product vending machines. For each data recording medium, the number of uses thereof is encoded on the data recording medium itself and memorized by each automatic service machine. A data recording medium is deemed correct by the automatic service machine if the number of uses encoded on the medium itself is not lower than the number of uses previously memorized in the automatic service machine; otherwise, the medium will be deemed false and can be withheld or otherwise rejected by the machine. Dissemination of information relative to a false data recording medium is achieved on presentation of the medium by encoding in addition to the aforesaid data, the number of uses of a data recording medium previously presented to the machine. Subsequent use thereof will of necessity cause that information to be transmitted to another automatic service machine.

11 Claims, 1 Drawing Figure

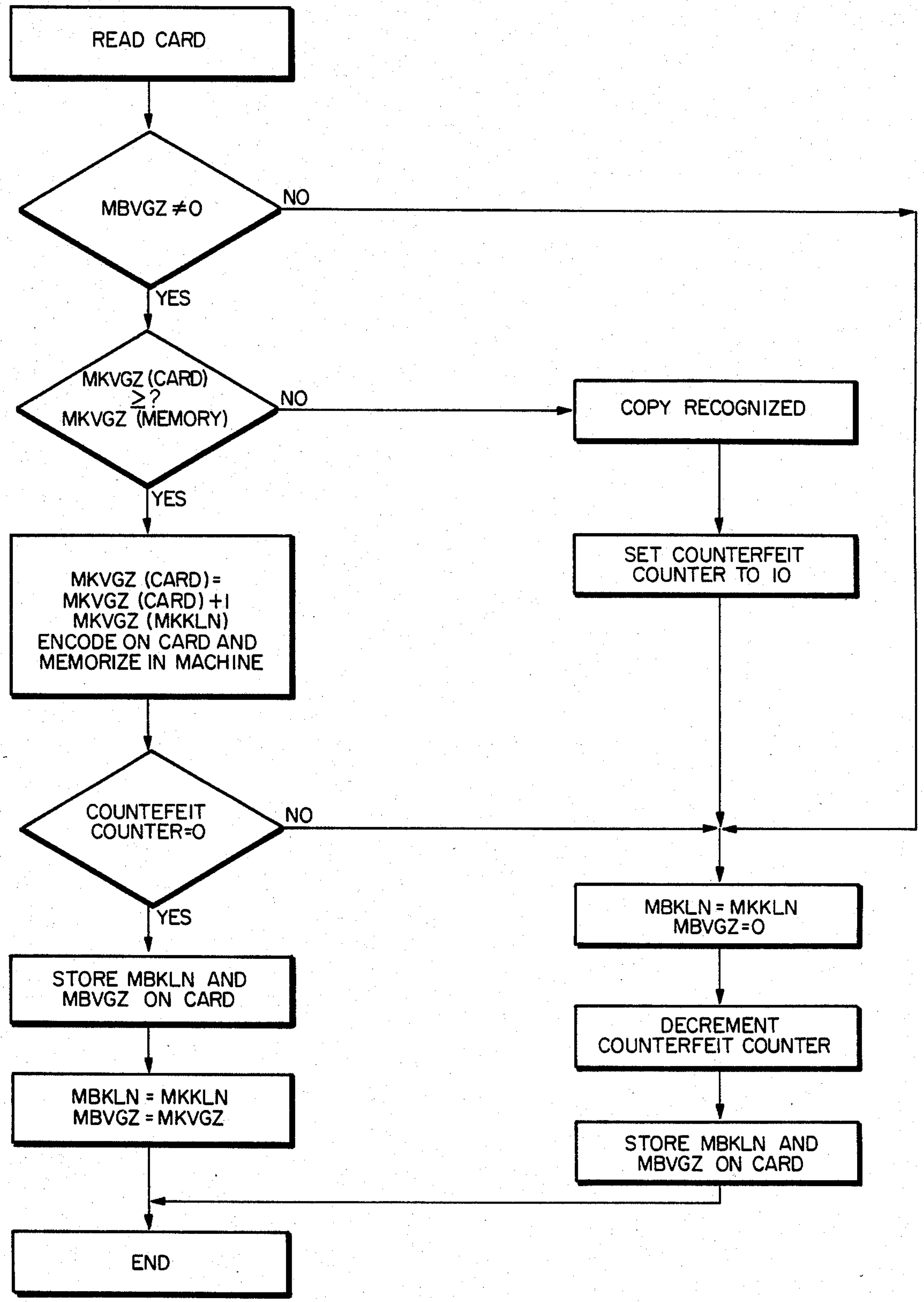
READ CARD
MBVGZ ≠ O
NO
YES
MKVGZ (CARD)
≥?
MKVGZ (MEMORY)
NO
COPY RECOGNIZED
YES
SET COUNTERFEIT COUNTER TO 10
MKVGZ (CARD) =
MKVGZ (CARD) + 1
MKVGZ (MKKLN)
ENCODE ON CARD AND
MEMORIZE IN MACHINE
COUNTEFEIT
COUNTER=O
NO
YES
MBKLN = MKKLN
MBVGZ = O
STORE MBKLN AND
MBVGZ ON CARD
DECREMENT
COUNTERFEIT COUNTER
MBKLN = MKKLN
MBVGZ = MKVGZ
STORE MBKLN AND
MBVGZ ON CARD
END

METHOD OF DETECTING FALSE DATA RECORDING MEDIA AND A DATA RECORDING MEDIUM THEREFOR

BACKGROUND OF THE INVENTION

1. Field of the Invention

The present invention relates, in general, to a method of detecting false or counterfeit data recording media and a data recording medium therefor. More particularly, the method and medium of the present invention is of especial utility in detecting unauthorized copies of magnetic cards adapted to encode credit data, identification or other information and is used to elicit service from one of a plurality of automatic service rendering or product vending machines. Such machines are typically set up in a service area for the dispensing of a product or a service in response to the presentation of the data recording medium to one of such machines. The value of the service rendered or the product dispensed by the automatic machine is subtracted from the users credit and any remaining credit is re-encoded on the data recording medium.

2. Description of the Prior Art

Theoretically, any number of magnetic credit cards or other data recording media may be forged, for example, by simply copying the information encoded on such checking or credit cards. These copied, or false, cards may then be used in several automatic service machines at a time at which indirect transmission and dissemination of counterfeiting information as provided for in the present invention is not prevented by otherwise attended operation. Such attended operation, while theoretically possible, is nonetheless inconsistent with the basic of concept of setting up automatic service machines in the first place. Such a scenario, while an extraordinary one, may nonetheless be remedied by various measures. For example, provisions may be made for a privilege system which provides for an allowed service area to be activated at given time intervals, which may be effected in the following manner: A privilege code is issued at a central location with the aid of random numbers. Each data recording medium, such as a checking or credit card, must initially be presented at that central location for verification and automatic encoding with a privilege code, which code is valid for only a specific period of time. All automatic service machines in the allowed area must then be set up to accept only those data recording media which have been properly privilege encoded. In a system of this kind, a false medium will be reliably recognized at the central location and may then and there be withheld to prevent futher abuse. Such a technique is, of course, more complex and functionally undesirable.

SUMMARY OF THE INVENTION

It is therefore an object of the present invention to provide a method of detecting false or counterfeit data recording media and a data recording media therefor which precludes the use of false or counterfeit data recording media to an extent at least sufficient to discourage the use of false data recording media.

The foregoing object is achieved in accordance with the method of the present invention wherein an automatic service machine currently presented a data recording medium performs the following steps, in addition to rendering the selected service and subtracting a corresponding amount from the current credit:

Firstly reading and memorizing a serial number encoded on the current data recording medium to identify the same;

Secondly reading and memorizing the number of prior uses of the current data recording medium as encoded on the data recording medium;

Thirdly reading the serial number encoded on the current data recording medium of at least one other data recording medium which during prior use of the current data recording medium was encoded thereon by the automatic service machine then used;

Fourthly reading the number of previous uses of the at least one other data recording medium as encoded on the current data recording medium by the automatic service machine used in such prior use of the current data recording medium and thus currently encoded on the data recording medium;

Incrementing by one the number of uses encoded on the data recording medium currently presented;

Firstly encoding on the current data recording medium the serial number of at least one data recording medium presented previously to the automatic service machine currently used, said serial number having been memorized in that machine;

Secondly encoding on the current data recording medium the number of uses of the at least one data recording medium previously presented to the automatic service machine currently used, the number of uses having been memorized by said machine;

Comparing the number of previous uses of the current data recording medium as memorized in the currently used automatic service machine with the number of its previous uses as read; and triggering a counterfeit detection signal in case the number read is lower than the number memorized.

In most practical applications it will be sufficient to encode on the currently presented data recording medium the serial number memorized in the currently used automatic service machine and the number of uses of a single data recording medium previously presented to the service machine currently used. Of course, to ensure even greater protection, it is possible to use the serial number of a greater number of data recording media which were presented in the past to the automatic service machine currently used. In case a single, previously used data recording medium is considered sufficient for the above purpose particularly effective protection will be obtained by encoding on the current data recording medium the serial number and the number of uses of the data recording medium last presented to the machine before the current one. In a particularly preferred embodiment of the method of the present invention, a data recording medium having been recognized as being false is withheld by the automatic service machine in response to a counterfeit detection signal and is thus withdrawn from further use. In this way, conclusive evidence of the fraud will be secured in a reliable manner. Additionally, further abuse by means of the false data recording medium will thereby be effectively prevented. In addition, the fact that the false medium has been withheld enhances the psychological deterent effect on the user of the false data recording medium.

The fact that a specific data recording medium has been recognized as being false may be disseminated preferably by encoding, in response to the detection of the false medium, the serial number and the number of uses of the false medium on the current data recording medium presented for use. This would be done for a pre-determined number of subsequent uses. Preferably, the serial number and the number of uses of the false data recording medium are encoded for ten subsequent uses.

Particularly reliable detection of a false data recording medium by all other automatic service machines is effectuated by setting the number of uses on a false data recording medium to zero right after it has been recognized as being false. For added safety against false media, the dissemination of information on a data recording medium having been recognized as false among the remaining machines may be promoted further by providing on the recording medium according to the present invention, in addition to those required for properly conducting a business transaction, security data in storage areas as follows:

First storage means for the serial number unique to each data recording medium;

Second storage means for a medium-related events register adapted to store the number of its uses;

Third storage means for the serial number of a prior user of the automatic service machine; and Fourth storage means for an events register to store the number of uses of the data recording medium held by the prior user of the automatic service machine.

According to the method and medium of the present invention, information on a data recording medium recognized as being false is transmitted in an avalanche-like manner to all other automatic service machines within the service area. In this way, the probability of a false medium remaining undetected may be made acceptably small.

A data recording medium according to the present invention may be in the form of a magnetic card which has the data magnetically encoded in the storage means mentioned above. Advantageously, the data is stored on a pre-determinable card track. As a result, the method and medium of the present invention creates a system for detecting false data recording media such as magnetic cards which is extremely flexible and very reliable in practical applications. Also, the inventive method and medium can be adapted without difficulties to the requirements of any particular situation, especially in light of the expenditures and the complexity justified for the detection of false documents.

BRIEF DESCRIPTION OF THE DRAWINGS

The above mentioned and other features and objects of the present invention and the manner of attaining them will become more apparent and the invention will be best understood by reference to the following description of an embodiment of the invention taken in conjunction with the following drawings, wherein:

The FIGURE shows a flow chart of the events taking place once a data recording medium has been presented to an automatic service machine to elicit a service or to cause a product to be dispensed.

DESCRIPTION OF A PREFERRED EMBODIMENT

In the description that follows, a data recording medium will also be referred to, for sake of brevity, as either a magnetic card or as a credit card. In addition to other information storage areas, each credit card according to the present invention has thereon at least four storage locations to receive data useful for the detection of false cards.

The designations of the four storage locations used and the associated contents are listed below:

First storage means MKKLN stores the card serial number of the currently used magnetic card;

Second storage means MKVGZ stores the contents of the events register of the currently used magnetic card;

Third storage means MBKLN stores the card serial number of the prior user of the automatic service machine; and Fourth storage means MBVGZ stores the contents of the events register of the prior user of the automatic service machine. By "prior user of an automatic service machine" is meant a user who happened to use a specific automatic service machine prior to the magnetic card owner having currently available a magnetic card for eliciting a service or sale from the machine.

The serial number in MKKLN is allocated to each magnetic card upon initial issuance thereof and enables each magnetic card to be uniquely identified. The events register MKVGZ is set to one upon initial issuance of the magnetic card and is incremented by one each time the magnetic card is used in an automatic service machine.

With reference to the FIGURE, in response to a specific magnetic card being presented to an automatic service machine for eliciting a service or sale, the following events take place:

The automatic service machine reads the entire contents of the magnetic card as shown in the input block of the logic flow diagram labelled "READ CARD".

After the automatic service machine has been enabled for rendering the desired service or for performing a sales operation, the events register on the currently presented magnetic card is incremented by one, in addition to the price of the selected service or article being subtracted from the user's credit. Incrementation is effected in the memory location associated with the respective card serial number.

Having been actualized this way, the events register is written back on the magnetic card together with the remainder of the data required for the business transaction.

In addition, the events register and the card serial number of the prior user of the automatic service machine (to be more exact: of that individual's magnetic card) are transferred to the magnetic card currently used.

A magnetic card or, in general, a data recording medium will be deemed correct if the count in the events register on the data recording medium is equal to or greater than the count memorized for that data recording medium in the events register of the automatic service machine being used as shown in the logic decision block labelled MKVGZ (card) $\geqq$ MKVGZ (memory).

If a data recording medium is false, such as a copy of a magnetic card, both the original and the copy show the same contents of the events register and, of course, the same card serial number. Use of the original or the copy causes actualization to take place as described above. As soon as the copy is presented to the automatic service machine after the original has been used, the copy will be recognized as being false by the count in its events register being lower than the count in the events register of the automatic service machine. In the case, the magnetic card or, generally, the data recording medium will be withheld.

As the various users may be assumed to use different automatic service machines with different frequencies, the events registers will be actualized regardless of any particular user's habits and without any individual being able to influence the process in that the events register and the card serial number of the prior user of the automatic service machine are encoded on the current user's magnetic card. In this way, indirect communication is established among all the automatic service machines within the allowed service area such that information relative to a data recording medium which may be false (such as a copy of a magnetic card) will spread very rapidly.

As soon as a magnetic card has been recognized as being a copy, the events register is set to zero and the automatic service machine registers this count together with the corresponding card serial number.

In that case, it is not the card serial number and the associated events register of the respective prior user (or of his data recording medium) which are encoded. Rather the automatic service machine encodes the serial number of the card of which the copy was detected and a value of zero for the events register, and it proceeds to do so for ten subsequent uses.

In this way, all other automatic service machines are quickly advised of the serial number of the magnetic card which has been copied. Receipt of the information that the events register is zero will cause every other automatic service machine (in addition to the one which has detected the false document) to, in turn, encode for ten times the serial number of the detected copy and a zero count of the events register (instead of the prior user's data) into storage locations MBKLN and MBVGZ, respectively.

The flow chart of the FIGURE in the drawing clearly shows the various possibilities of a use event in response to presentation of a data recording medium to an automatic service machine.

In order to cause the aforesaid data to be transmitted from the copy to the other automatic machines (instead of the prior user's card serial number and events register) for a total of ten uses after a copy has been detected, a counterfeit counter is set to 10 and decremented by one for each use. As soon as the counterfeit counter has reached a count of zero, encoding of the prior user data will resume.

What has been provided, therefore is a method of detecting false or counterfeit data recording media and a data recording media therefor which precludes the use of false or counterfeit data recording media to an extent at least sufficient to discourage the use of false data recording media. Further, while there has been described above the principles of the invention in conjunction with specific apparatus, it is to be clearly understood that this description is made only by way of example and not as a limitation to the scope of the invention.

What is claimed is:

1. A method for detecting false data recording media, particularly copies of magnetic cards which are adapted to store credit data in addition to identification and other information and used for presentation to one of a pre-determined plurality of automatic service rendering or product vending machines set up in an allowed area for eliciting a selective service or the dispensing of a product from any of said machines, with the value of said service or product elicited being subtracted from the user's existing credit and the remaining credit being re-stored on said data recording medium, characterized by the currently presented one of said automatic service machines, upon presentation of a data recording medium, performing the following steps in addition to those required for rendering said selected service or dispensing said selected product and for the associated credit subtraction, said steps comprising:

first, reading and memorizing a serial number encoded on said currently presented data recording medium to identify the same;

secondly, reading and memorizing the number of prior uses of said currently presented data recording medium as encoded thereon;

thirdly, reading the serial number of at least one other of said data recording media which during prior use of said currently presented data recording medium was encoded thereon by said automatic service machine then used, said serial number being encoded on said currently presented data recording medium;

fourthly, reading the number of previous uses of said at least one other data recording medium which was encoded on said currently presently data recording medium by said automatic service machine priorly presented said current data recording medium, said number of previous uses thus being currently encoded on said data recording medium;

incrementing by one of the number of uses encoded on said currently presented data recording medium;

firstly, encoding on said currently presented data recording medium a serial number of at least one data recording medium previously presented to said automatic service machine currently used, said serial number having been memorized in said machine;

secondly encoding on said currently presented data recording medium the number of uses of said at least one data recording medium previously presented to said automatic service machine currently used, said number of uses having been memorized in said machine;

comparing the number of previous uses of said currently presented data recording medium as memorized in said currently used automatic service machine with the number of its previous uses as read; and triggering a counterfeit detection signal in the event that the number of uses read by said automatic service machine is lower than the number of uses memorized.

2. The method of claim 1 further comprising the step of thirdly encoding on said currently presented data recording medium a serial number and the number of uses of a single data recording medium previously used in said currently used automatic service machine, as memorized in said currently used automatic service machine.

3. The method of claim 2 further comprising the step of fourthly encoding said serial number and the number of uses of said data recording mediuum presented last before the current one.

4. The method of claim 1 further comprising the step of withholding by the automatic service machine said data recording medium which has been recognized as being false in response to a counterfeit detection signal, thus withdrawing said medium from the user.

5. The method of claim 1 further comprising the step of temporarily encoding for a pre-determinable number of subsequent uses following recognition of said false data recording medium the serial number and the number of uses of said false data recording medium on data recording medium presented for current use.

6. The method of claim 5 further comprising the step of further encoding the serial number and the number of uses of said false data recording medium for ten subsequent uses.

7. The method of claim 1 further comprising the step of immediately setting the number of uses prior to zero after a false data recording medium has been recognized.

8. The method of claim 7 further comprising the step of encoding by each automatic service machine in a pre-determinable number of subsequent uses on said currently presented data recording medium a zero for the number of uses and the corresponding serial number as prior user data in response to having ascertained as being zero the number of uses of said previously used data recording medium recorded on said currently presented data recording medium.

9. A data recording medium characterized by said data recording medium having thereon in addition to those provided for properly conducting a business transaction the following storage means to receive data for protection against false media, said medium comprising:

first storage means for a serial number assigned to each specific data recording medium;

second storage means for a medium-related events register on said data recording medium to store the number of uses of said medium;

third storage means for the serial number of a prior user of an automatic service machine; and fourth storage means for an events register to store the number of uses of said data recording medium of the prior user of said automatic service machine.

10. The data recording medium of claim 9 in which said medium comprises a magnetic card having said data magnetically encoded thereon.

11. The data recording medium of claim 10, further comprising pre-determinable track on said card to store said data thereon.

* * * * *